United States Patent
Hittmann et al.

(10) Patent No.: US 8,667,697 B2
(45) Date of Patent: Mar. 11, 2014

(54) ECCENTRIC GEAR ARRANGEMENT

(75) Inventors: Markus Hittmann, Weinstadt (DE);
Ralf Schenk, Weinstadt (DE); Reinhard Friedrich, Waiblingen (DE); Günter Mayer, Untereisesheim (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 286 days.

(21) Appl. No.: 12/929,486

(22) Filed: Jan. 28, 2011

(65) Prior Publication Data
US 2011/0179651 A1 Jul. 28, 2011

(30) Foreign Application Priority Data
Jan. 28, 2010 (DE) .................. 10 2010 005 964

(51) Int. Cl.
*B23D 49/00* (2006.01)
(52) U.S. Cl.
USPC ................ 30/392; 30/353; 30/277.4; 30/369
(58) Field of Classification Search
USPC ........... 30/220, 392, 369, 353, 277.4; 56/259, 56/257
See application file for complete search history.

(56) References Cited

U.S. PATENT DOCUMENTS

| | | |
|---|---|---|
| 2,787,111 A | 4/1957 | Templeton |
| 3,897,630 A | 8/1975 | Glover et al. |
| 8,011,272 B1* | 9/2011 | Bich et al. ................ 74/595 |
| 2005/0115080 A1* | 6/2005 | Sasaki et al. ............... 30/210 |
| 2008/0134521 A1* | 6/2008 | Hanada et al. ............. 30/173 |
| 2009/0145096 A1* | 6/2009 | Priepke ..................... 56/257 |

FOREIGN PATENT DOCUMENTS

| | | |
|---|---|---|
| DE | 32 32 339 A1 | 3/1984 |
| DE | 39 32 339 | 4/1991 |

OTHER PUBLICATIONS

European search report issued on Apr. 19, 2011 in the parallel European patent application No. 11000301.

* cited by examiner

*Primary Examiner* — Omar Flores Sanchez
(74) *Attorney, Agent, or Firm* — Walter Ottesen P.A.

(57) ABSTRACT

The invention relates to an eccentric gear arrangement of a motor-driven, hand-guided hedge trimmer (1). The eccentric gear arrangement includes two shearing blades (2, 3) driven in mutually opposite directions over a displacement path (a). Each shearing blade has a connecting link (4, 5) as well as an eccentric wheel (6) having a drive wheel (7) and two eccentrics (8, 9). The eccentric wheel (6) rotates about a rotational axis (10). The two connecting links (4, 5) lie directly above one another. The two eccentrics (8, 9) are arranged on the same side of the drive wheel (7) and engage each in one of the two connecting links (4, 5). The two shearing blades (2, 3) have contact pressure surfaces (11, 12) in the region of their two connecting links (4, 5) and are offset with respect to each other in such a manner that they are exposed at least over a portion of the displacement path (a). Two downholders (13, 14) are provided which act each on one of the assigned contact pressure surfaces (11, 12).

13 Claims, 3 Drawing Sheets

ECCENTRIC GEAR ARRANGEMENT

CROSS REFERENCE TO RELATED APPLICATION

This application claims priority of German patent application no. 10 2010 005 964.1, filed Jan. 28, 2010, the entire content of which is incorporated herein by reference.

BACKGROUND OF THE INVENTION

Motor-driven, hand-guided hedge cutters include two shearing blades running in mutually opposite directions. In such hedge cutters, eccentric drives are used in addition to connecting rod drives, wherein a rotatingly driven eccentric wheel is provided which has two eccentrics mutually offset by 180°. These two eccentrics engage in connecting links of the two shearing blades whereby the shearing blades are oscillatingly driven in mutually opposite directions.

In a known configuration, the two shearing blades including their two connecting links lie directly one atop the other. The two eccentrics are arranged on the same side of the corresponding drive wheel and engage in one of the two connecting links. This facilitates the exchange of the shearing blades, because they can be pulled off the eccentric drive when the gear housing is open, without having to disassemble the eccentric wheel itself.

In practice, however, it has been shown that, when developing large shearing forces, the drive eyes of the shear blades defined by the connecting links can axially lift off the eccentrics, so that the drive of the shear blade arranged remotely from the drive wheel is interrupted. The shearing blade which lies between the above-mentioned shear blade and the drive wheel can also tend to lift up. In this case, both eccentrics can engage simultaneously in the assigned connecting link. This leads to a blockage of the entire hedge trimmer drive.

To prevent lift-up, a cover can be applied which holds the connecting links of the shear blades in their axial position on the eccentric drive with a counterforce. However, the two shearing blades are stacked one atop the other. For this reason, such a cover can apply a holding force only upon the outer shearing blade. This shearing force is then transmitted to the shearing blade lying underneath. This leads to a considerable increase in friction between the two shearing blades and therefore to an unwanted increase in temperature in the eccentric drive, which impairs the permanent lubrication. The lubricant can turn liquid and escape or burn. In total, the wear properties of this arrangement are not satisfactory.

SUMMARY OF THE INVENTION

It is an object of the invention to improve an eccentric drive arrangement of the kind described above such that an increased operating reliability is provided with reduced friction losses.

The eccentric gear arrangement of the invention is for a motor-driven handheld hedge trimmer. The eccentric gear arrangement includes: first and second shearing blades driven in mutual opposition to each other over a displacement path (a); the first and second shearing blades having respective first and second connecting links formed thereon and the connecting links lying directly one above the other; an eccentric wheel rotatably driven about a rotational axis; the eccentric wheel having a drive wheel defining a first side; the eccentric wheel further having first and second eccentrics arranged on the first side and engaging corresponding ones of the first and second connecting links; the first and second shearing blades having respective first and second contact pressure surfaces formed thereon in the region of the first and second connecting links; the first and second contact pressure surfaces being offset with respect to each other so as to cause the first and second contact pressure surfaces to be exposed over at least a portion of the displacement path (a); and, first and second downholders for acting on corresponding ones of the first and second contact pressure surfaces.

According to a feature of the invention, the two shearing blades are provided with contact pressure surfaces in the region of their respective connecting links. The pressure contact surfaces are arranged offset from each other in such a manner that they are exposed at least over a portion of the displacement path of the shearing blade and that two downholders are provided which, independently of each other, each act on a corresponding one of the contact pressure surfaces assigned thereto.

With the arrangement according to the invention, a holding force can be applied to the two contact pressure surfaces, independently of each other and directly, without it being necessary to transfer this holding force through the outer shearing blade and to the inner shearing blade. Accordingly, no additional friction caused by the holding force occurs between the two shearing blades. Friction and wear are reduced. Also, the temperature developed because of friction is limited, so that the lubricant fill of the eccentric gear arrangement can unfold without impairing its lubricating effect. The drive power, which is required at high loads, is reduced, while the service life caused by wear is increased.

It can be practical to arrange the contact pressure surfaces, for example, laterally of the connecting links. In this case, the contact pressure surface of the first shearing blade lies, for example, on the left-hand side and the contact pressure surface of the second shearing blade lies on the opposite right-hand side. Thus, the two contact pressure surfaces are prevented from covering each other, so that a contact pressure force can be applied directly onto the contact pressure surfaces by means of the downholder. In an advantageous embodiment, the shearing blades have respective contact pressure extensions running parallel to the displacement path. The contact pressure extensions are arranged on a rear end of the shearing blades lying opposite to the shearing sections in the direction of the displacement path and are offset laterally with respect to each other in a lateral direction lying transversely to the displacement path. The contact pressure surfaces are formed on the contact pressure extensions. A mutual covering is avoided independently of the displacement path because of the lateral offset of the two contact pressure extensions. The contact pressure extensions are arranged on the rear end and extend in the longitudinal direction of the shearing blades, that is, in the direction of the displacement path. For this reason, little installation space is needed in the lateral direction, whereby the arrangement can be kept slim and compact. Lateral eccentricities in the introduction of force are minimized.

In an advantageous further embodiment, the contact pressure extensions with their contact pressure surfaces are of a length which is at least approximately equal to the displacement path. This ensures that the downholders at least approximately can act on the assigned contact pressure surfaces over the entire displacement path. Accordingly, the down-holding effect is maintained at least approximately over the entire displacement path.

In addition, it can be practical that the shearing blades have slide surfaces disposed laterally of the connecting links, by means of which they can glide on each other, whereby the second shearing blade, which lies remote from the drive wheel, has at least one further contact pressure surface overlapping with the assigned slide surface, and that a further downholder is provided which acts on the further contact pressure surface. Especially the slide surfaces, the further contact pressure surfaces, and the further downholders lie in mutually opposite pairs referred to the displacement path. The above-described holding effect on the contact pressure surfaces is hereby supplemented, so that all in all the arrangement is very rigid. In the region of the further downholders and pertinent further contact pressure surfaces, the holding force transmitted directly only onto the outer shearing blade and, through this shearing blade, indirectly onto the inner shearing blade. The resulting additional friction, however, is low, since the actual down-holding effect is applied on the free-lying contact pressure surfaces, so that here only a supporting down-holding effect (a down-holding effect stiffening the arrangement) without any significant friction farce increase is observed. The symmetrical arrangement leads to a uniform load application which is maintained over the entire displacement path of the shearing blades, that is, over the entire rotational angle of the eccentric drive.

A gear housing is provided for accommodating the eccentric wheel as well as the shearing blades in the region of their connecting links and their contact pressure surfaces. Here, it can be practical to configure the downholders directly on the gear housing, that is, on the housing cover thereof. However, it is advantageous to arrange, in the gear housing, a holding plate including the downholders. Especially at least one and preferably the two further downholders are arranged on the holding plate, with the downholders acting on the lateral contact pressure surfaces. In this way, the housing is relieved of load, so that it can be manufactured of thin-walled and lightweight light-metal casting or the like. The holding plate can, for example, be manufactured of steel plate or any other high-strength material for accommodating the high holding forces, regardless of the selected material of the gear housing.

Preferably, the holding plate including the downholders and especially including at least the one further downholder is configured as a one-piece preformed sheet metal part. Budget-priced manufacture is combined with high load capacity, that is with high applicable pull-down forces.

In a preferred embodiment, the holder plate is held between the housing shell and the housing cover of the gear housing especially via threaded fasteners and/or via clamping and/or via form-locking. After removal of the housing cover, the holding plate can be removed easily, for example, to be able to exchange the shearing blades. Furthermore, the attachment of the holding plate between the housing shell and the housing cover leads to a favorable and large surface distribution of force introduction which favors the objective of a lightweight construction.

It can be practical to support the journalling pin of the eccentric wheel in the housing cover. Preferably, the holding plate has a bearing opening for the above-mentioned journalling pin. Because of the high holding forces to be applied the holding plate must be dimensioned in a correspondingly sturdy manner and be made of a corresponding material. For this reason and without additional effort, the holding plate can function also as a heavy-duty bearing unit for the journalling pin of the eccentric wheel, whereby the gearing housing is further relieved of load.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
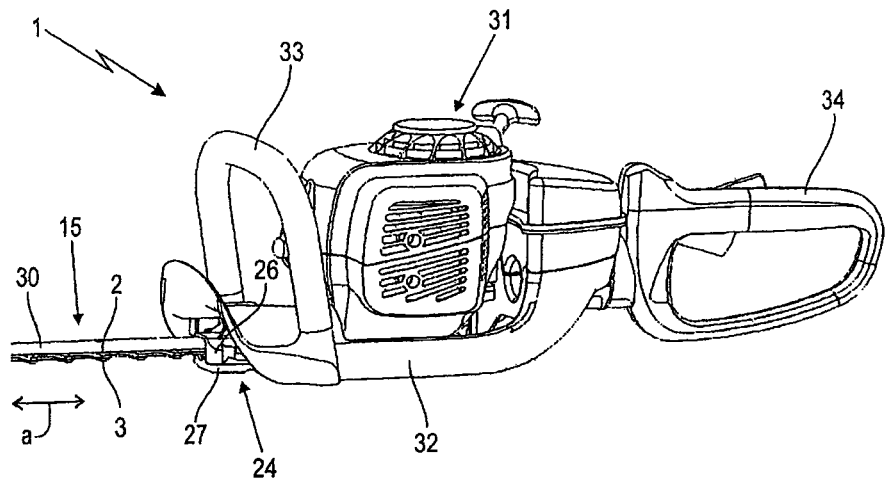
FIG. 1 is a perspective view of a hedge trimmer having an eccentric gear arrangement configured in accordance with the invention for two shearing blades driven in mutually opposite directions.

FIG. 1 shows, in a perspective view, a hand-guided hedge trimmer 1 having a drive motor 31 not shown in greater detail as well as a housing 32, a front handle 33 and a rear handle 34. The drive motor can be an electric motor operated from power mains or operated from batteries and, in the embodiment, the drive motor is a single-cylinder, two-stroke combustion engine. The engine could also be a four-stroke combustion engine.

An eccentric gear arrangement according to the invention is arranged on the front end of the housing 32 facing away from the user. The eccentric gear arrangement includes two shearing blades (2, 3), which are driven in opposite directions over a displacement path (a), as well as a gear housing 24 having a housing shell 26 and a removable housing cover 27. The housing shell 26 can be formed or attached to the housing 32. The two shearing blades (2, 3) lie with their motor-near section in the gear housing 24 and have a shearing section 15 with shearing teeth outside of the gear housing 24. The shearing teeth are provided for cutting branches or the like. The two shearing blades (2, 3) lie directly one upon the other and are oscillatingly guided over the displacement path (a) on a fixed carrier 30. The oscillating longitudinal movement provided by the drive motor 31 is generated by the eccentric gear arrangement described in greater detail hereinafter.

Figure 2:
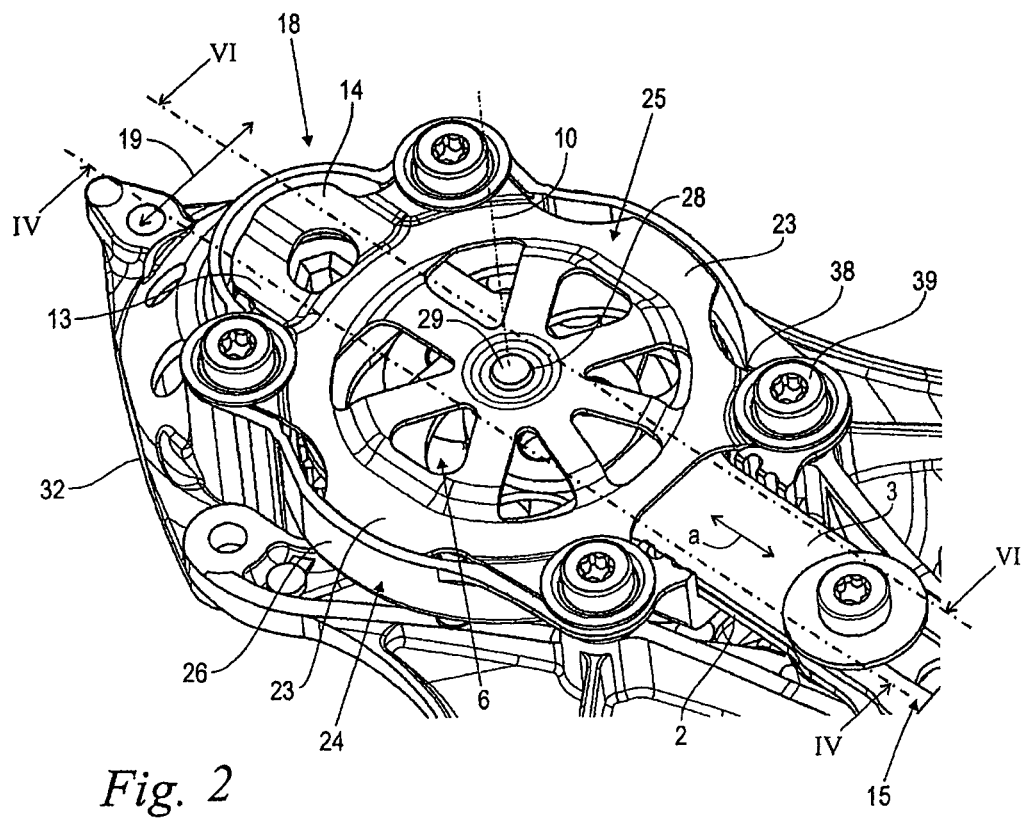
FIG. 2 is a bottom perspective view showing the eccentric gear arrangement of FIG. 1 with the housing cover removed and with a holding plate for directly holding down the two shearing blades on the eccentric wheel.

In a perspective bottom view, FIG. 2 shows the eccentric gear arrangement of the hedge trimmer 1 of FIG. 1. Here, the housing cover 27 (FIG. 1) is removed from the housing shell 26 of the gear housing 24, with the housing shell being formed on the housing 32. An eccentric wheel 6, which is described in detail below, is part of the eccentric gear arrangement of the invention. The eccentric wheel 6 is rotatably driven about a rotational axis 10 by means of drive motor 31 (FIG. 1) and, in turn, oscillatingly drives the two shearing blades (2, 3) along the displacement path (a). The shearing blades (2, 3) lie directly one atop the other in the up-direction running in parallel to the rotational axis 10.

A lateral direction 19 lies perpendicularly to the up-direction predetermined by the rotational axis 10, and perpendicularly to the longitudinal direction running in the direction of the displacement path (a). The eccentric gear arrangement includes a first downholder 13 and a second downholder 14 which are laterally offset with respect to each other in the lateral direction 19 referred to the longitudinal axis of the arrangement. The downholders act on the two shearing blades (2, 3), as will be described in detail hereinafter. In addition thereto, a pair of third downholders 23 is provided and these downholders, too, lie opposite to each other symmetrically to the longitudinal axis in the lateral direction 19. The first and second downholders (13, 14) are arranged on a rear end 18 of the shearing blades (2, 3) while the two third downholders 23 lie directly laterally of the rotational axis 10. The rear end 18 of the shearing blades (2, 3) lies opposite the shearing sections 15 in the direction of the displacement path (a).

The downholders (13, 14, 23) can be formed directly on the gear housing 24 or on the housing cover 27 (FIG. 1) thereof and are formed by a separate holding plate 25 in the embodiment shown. The holding plate 25 including the downholders (13, 14, 23) is configured as a single piece as a preformed sheet metal part and, in addition, has a bearing opening 28 wherein a journalling pin 29 of the eccentric wheel 6 is rotatably supported. The holding plate 25 is held between the housing shell 26 and the housing cover 27 removed here (see FIG. 1) via threaded fasteners as well as by clamping. For this purpose, the holding plate 25 includes eyelets 38 formed as one piece. The eyelets are held in a form-fit connection in moldings of the gear housing 24 or of the holding shell 26, and attachment screws 39 of the housing cover 27 pass therethrough. Furthermore, the outer edges of the downholder 23 are supported laterally against the wall of the gear housing 24 or of the holding shell 26. In this way, the holding plate 25 is rigidly and tightly connected to the gear housing 24 in order to be able to take up the down-holding forces at the downholders (13, 14, 23) as well as the bearing forces at the bearing opening 28. The gear housing 24 is manufactured of a thin-walled, light-metal casting but can also be made of a suitable plastic material.

Figure 3:
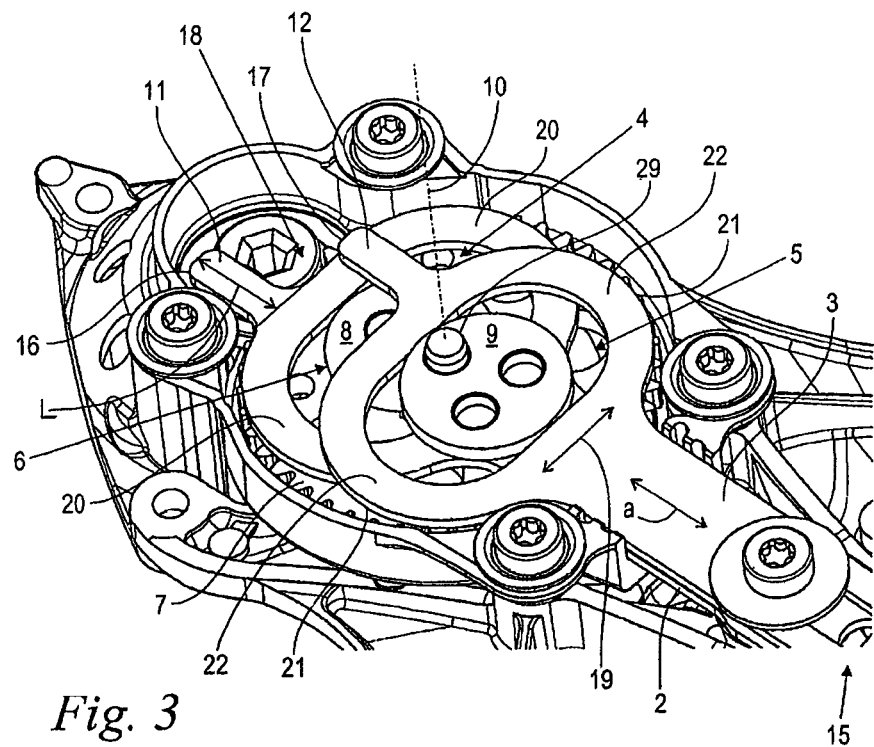
FIG. 3 shows the arrangement of FIG. 2 with the holding plate removed and further details for the configuration of the eccentric drive and of the shearing blades having contact pressure extensions formed thereon.

FIG. 3 shows the arrangement of FIG. 2 with the holding plate 25 being removed. Here, it is shown that the eccentric wheel 6 comprises a drive wheel 7, which is configured as a toothed wheel, two eccentrics (8, 9) and the journalling pin 29. The two eccentrics (8, 9) are disposed on the same side surface of the drive wheel 7 and are fixedly connected to the drive wheel 7 so as to rotate therewith. Both eccentrics (8, 9) have a circular disc shape and are arranged eccentrically to the rotational axis 10 with a mutual phase offset of 180°. The first eccentric 8 lies directly on the side surface of the drive wheel 7, while the second eccentric 9 is arranged directly over the first eccentric 8 in the up-direction predetermined by the rotational axis 10. The drive wheel 7 and the two eccentrics (8, 9) are connected to each other in a form-fit manner and are hard-soldered.

In the region of the eccentric wheel 6, the two shearing blades (2, 3) have a frame-shaped form as a drive eye having an inner oval opening. The longitudinal axis of the oval opening extends in the lateral direction 19. With the two oval openings, a first connecting link 4 of the first shearing blade 2 and a second connecting link 5 of the second shearing blade 3 are formed. The two shearing blades (2, 3) with their two connecting links (4, 5) lie directly one above the other. The first eccentric 8 engages in the first connecting link 4 of the first shearing blade 2, while the second eccentric 9 engages in the second connecting link 5 of the second shearing blade 3. Due to the driven rotational movement of the two eccentrics (8, 9) engaging in the connecting links (4, 5), the two shearing blades (2, 3) are oscillatingly driven in the longitudinal direction in opposite directions over the displacement path (a). A longitudinal guide (not shown in greater detail) of the two shearing blades (2, 3) ensures that only a longitudinal movement of the two shearing blades (2, 3) is caused without lateral movement components.

The two shearing blades (2, 3) have slide surfaces (20, 21) on the surfaces of the drive eyes enclosed by the connecting links (4, 5), with the surfaces facing each other. The two shearing blades (2, 3) glide on one another in the region of the eccentric wheel 6 along their oscillating displacement path. Lying opposite to the slide surface 21, the second shearing blade 3, which lies opposite the drive wheel 7, furthermore has contact pressure surfaces 22. In total, there are two slide surfaces 20, two slide surfaces 21, and two contact pressure surfaces 22, which lie opposite each other in pairs in the lateral direction 19 and are arranged symmetrically to the longitudinal axis of the arrangement.

The rear end 18 lies opposite the shearing sections 15 in the longitudinal direction. On the rear end 18, the two shearing blades (2, 3) each have contact pressure extensions (16, 17) which are formed directly on the drive eyes defining the connecting links (4, 5). The contact pressure extensions (16, 17) are formed as lugs and run in the longitudinal direction predetermined by the displacement path (a). The two contact pressure extensions (16, 17) are laterally offset with respect to each other in the lateral direction 19 symmetrically to the longitudinal axis of the arrangement, so that they cannot cover each other along the entire displacement path (a) and cannot come into contact with each other. Because of the entire symmetrical configuration, two identically configured shearing blades (2, 3) can be used. One of the two shearing blades (2, 3) is rotated by 180° about its longitudinal axis relative to the other shearing blade (3, 2) and comes into contact engagement therewith. The flat sides of the contact pressure extensions (16, 17) both lie facing away with respect to the drive wheel 7. On these flat sides, respective contact pressure surfaces (11, 12) are formed. The two contact pressure extensions (16, 17) including their contact pressure surfaces (11, 12) extend in the direction of the displacement path (a) over the entire length L. The length L is preferably equal to the amount of the displacement path (a) or longer. Furthermore, the two contact pressure surfaces (11, 12) are arranged in an offset manner such that with respect to each other they lie exposed at least over a portion of the displacement path (a), preferably over the entire displacement path (a), so that especially the first contact pressure surface 11 of the first shearing blade 2 is not covered by portions of the second shearing blade 3 lying thereabove along the displacement path (a).

Figure 4:
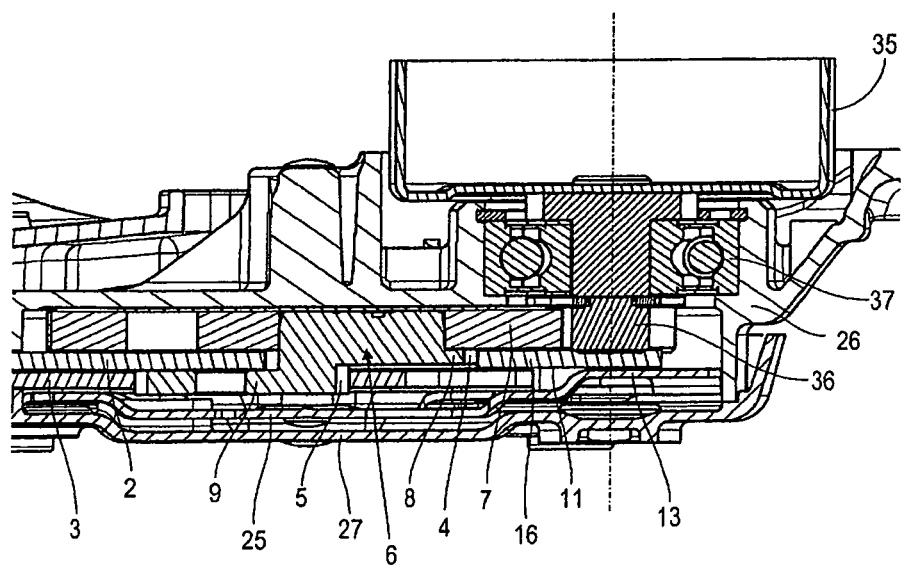
FIG. 4 is a longitudinal section view of the arrangement of FIG. 2 taken along section line IV-IV thereof with the blade position of FIG. 3 and with a downholder acting on the first shearing blade.

FIG. 4 shows a longitudinal section view of the arrangement of FIG. 2 along section line IV-IV of FIG. 2 with the housing cover 27 seated in place and with the shearing blades in the position shown in FIG. 3. The same features are identified with the same reference numerals. In the housing shell 26, a bearing 37 is inserted and configured as a ball bearing, wherein a two-part shaft arrangement having a drive pinion 36 is supported. A clutch drum 35 of a centrifugal clutch is fixedly connected to the shaft arrangement so as to rotate therewith. The drive pinion 36 meshes with the drive wheel 7 of the eccentric wheel 6. The drive wheel 7 is configured as a toothed wheel. Above a predetermining clutch speed of the drive motor 31 (FIG. 1), the centrifugal bodies (not shown) engage in force-fitted connection on the inner side in the clutch drum 35, whereby the clutch drum 35 including the drive pinion 36 is set into rotation. This rotation is transmitted to the eccentric wheel 6 whereby the shearing blades (2, 3) are moved by means of the eccentrics (8, 9) and the connecting links (4, 5) in the manner described above.

The perspective view of FIG. 2 shows that the two downholders (13, 14) are offset with respect to each other in the up-direction predetermined by the rotational axis 10. The downholders (13, 14) are configured on the holding plate 25. This elevation offset is equal to the elevation offset of the two shearing blades (2, 3), which lie one above the other and which are configured overall to be planar. For this reason, also the two contact pressure extensions (16, 17) including their contact pressure surfaces (11, 12) (FIG. 3) have the same elevation offset with respect to each other.

The longitudinal section view of FIG. 4 shows that the first downholder 13 lies directly (that is, without an interposition of a portion of the second shearing blade 3) on the first contact pressure surface 11 of the first contact pressure extension 16 of the first shearing blade 2 and, in this way, presses the shearing blade 2 against the drive wheel 7, without this assigned holding force acting on the second shearing blade 3. The first downholder 13 is formed on the holder plate 25. Therefore, the first shearing blade 2 with its first connecting link 4 cannot lift off the assigned first eccentric 8.

Figure 5:
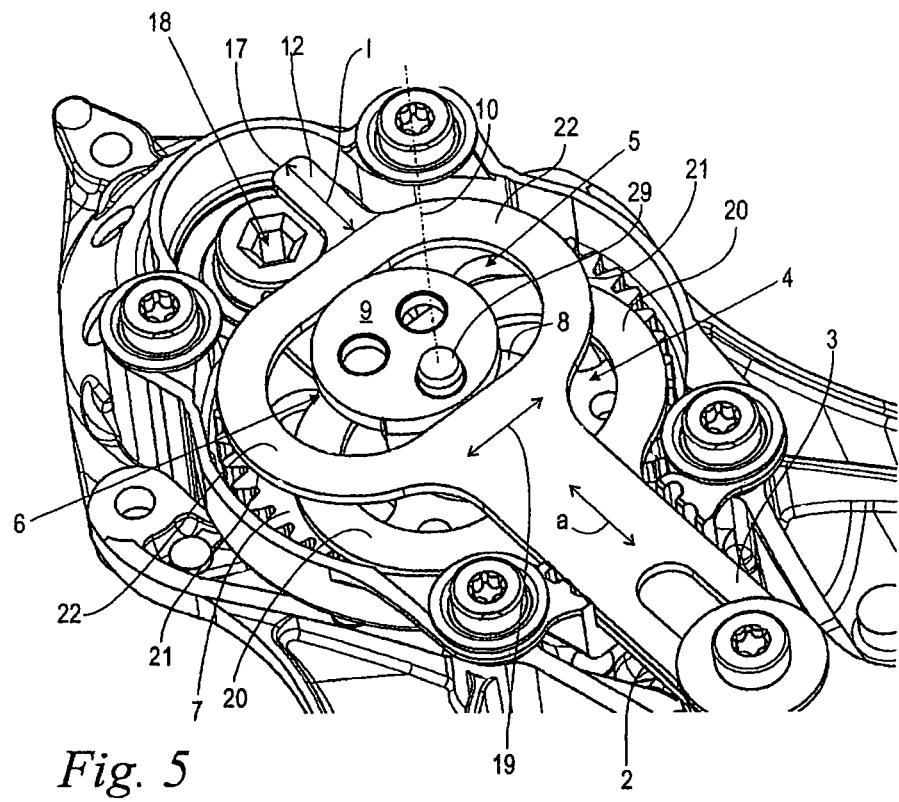
FIG. 5 shows the arrangement of FIG. 3 with the eccentric wheel rotated by 180° and correspondingly mutually offset shearing blades; and, FIG. 6 is a longitudinal section taken along section line VI-VI of FIG. 2 and showing the shearing blade position of FIG. 5 with the second downholder lying against the second shearing blade.

FIG. 5 shows the arrangement of FIG. 3 with the eccentric wheel 6 rotated by 180°. Here too, the same features are identified by the same reference numerals. The two shearing blades (2, 3) including their respective contact pressure extensions (16, 17) are displaced alternately with respect to each other by displacement path (a) as compared to the illustration according to FIG. 3. In the forwardmost position of the first shearing blade 2 shown here, contact pressure extension 16 thereof with the pertinent contact pressure surface 11 (FIG. 3) is covered just barely by the second shearing blade 3 disposed thereabove, so that in this forwardmost extreme position the first downholder 13 does not act on the assigned contact pressure surface 11, which is a departure from the illustration according to FIG. 4. This can be tolerated, because the cutting forces occurring in this extreme position of the first shearing blade 2 and the resulting lift-off tendency of the first shearing blade 2 from the assigned first eccentric 8 are negligibly small. However, as soon as the shearing blade (2, 3) assumes a position departing only slightly from the position of FIG. 5, the downholder 13 exerts its support function on the contact pressure surface 11 of the first shearing blade 2 in correspondence to the illustration of FIG. 4. A configuration, however, can also be practical wherein the two contact pressure surfaces (11, 12) are configured correspondingly longer. Then, the supporting effect occurs over the entire displacement path (a).

Figure 6:
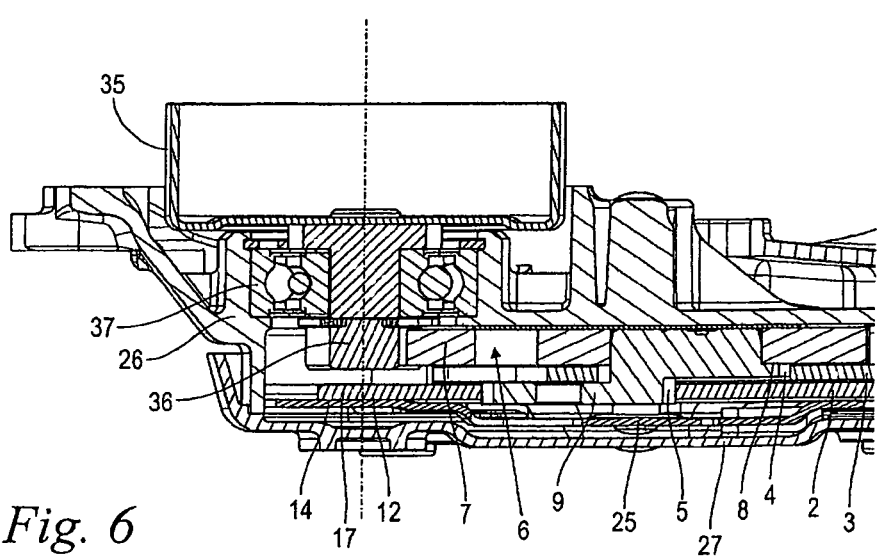

FIG. 6 shows a longitudinal section view of the arrangement of FIG. 2 taken along section line VI-VI of FIG. 2 with the shearing blades having the position shown in FIG. 5. In accordance with FIG. 4, the same features are identified by the same reference numerals, unless given otherwise. The downholder 14 is offset in elevation with respect to the first downholder 13 in correspondence to the illustration shown in FIGS. 2 and 4. The downholder 14 is also laterally offset with respect to the first downholder 13. The downholder 14 lies supportingly against the second contact pressure surface 12 of the second contact pressure extension 17 of the second shearing blade 3 and thereby applies a holding force to the second shearing blade 3 in the up-direction toward the drive wheel 7, due to which the second shearing blade 3 cannot lift off from the assigned second eccentric 9 at high loads either. The contact or holding force is applied on the second contact pressure surface 12 directly by the second downholder 14, without any parts of the first shearing blade 2 lying therebetween. The two contact pressure extensions (16, 17) corresponding to the illustration of FIG. 3 are furthermore laterally offset with respect to each other. For this reason, the holding force, which acts on the second contact pressure extension 17, is not transmitted to the first contact pressure extension 16 of the first shearing blade 2.

In total, FIGS. 2 to 6 show that the two shearing blades (2, 3) are held down independently of each other and directly in the region of the eccentric wheel 6 and are prevented from lifting up, without the holding forces associated therewith leading to an increased friction between the two shearing blades (2, 3). In the two extreme positions of the shearing blades (2, 3) according to FIGS. 3 and 4 or FIGS. 5 and 6, only one of the two downholders (13, 14) presses down on the correspondingly assigned contact pressure extension (16, 17). In all deviating intermediate positions, the two shearing blades (2, 3) are simultaneously held down by the downholders (13, 14) on their contact pressure extensions (16, 17); however, they do not mutually influence each other. In accordance with the illustration of FIG. 3, the second contact pressure extension 17 of the second shearing blade 3 corresponding to the illustration of FIG. 3 is supported against the drive eye of the first shearing blade 2, with the drive eye enclosing the connecting link 4. The connecting links (4, 5) cannot lift off the assigned eccentrics (8, 9), so that a force transfer between the eccentrics (8, 9) and the shearing blades (2, 3) is ensured even at high operating loads.

The two eccentrics (8, 9) lie next to each other in the lateral direction 19 in an intermediate position (not shown) between the two extreme positions of the shearing blades (2, 3) of FIGS. 3 and 5. The two connecting links (4, 5) lie overlapped one above the other. Here, the case is to be considered that simultaneous lift-off of both connecting links (4, 5) can lead to a situation where the second eccentric 9 can simultaneously engage in both lifted-up connecting links (4, 5), which would lead to an immediate blocking of the drive. This, too, is prevented by the downholders (13, 14) and the contact pressure extensions (16, 17). In addition, the two abovementioned downholders 23 are provided to support the downholding action of the downholders (13, 14) especially in the above-mentioned mid intermediate position, and to exclude blocking of the drive. A comparison of FIGS. 2, 3, and 5 shows that the two downholders 23 act on the assigned contact pressure surfaces 22 which, in turn, lie overlapped with the opposite slide surfaces 21. In this manner, especially in the above-mentioned mid intermediate position, an additional holding force is applied by the third downholders 23 on the third contact pressure surfaces 22 of the second shearing blade 3, which force is also transmitted to the intermediate first shearing blade 2 via the slide surfaces (21, 20) and thereby supplements or improves the down-holding action on the two shearing blades (2, 3) in the region of the eccentric wheel 6.

By means of the arrangement of the two contact pressure extensions on the rear end of the shearing blades, the latter can be arranged as closely as possible to each other in the lateral direction. The lateral offset between the two pressure contact extensions (16, 17) is selected to be so small as to enable the same to be technically realized in order to keep non-symmetry as small as possible during down-holding. In connection with the contact pressure surfaces 22 arranged symmetrically to the longitudinal axis, an at least approximately symmetrical introduction of down-holding forces into the two shearing blades (2, 3) will result, which reduces the tendency of load-induced deformation.

It is understood that the foregoing description is that of the preferred embodiments of the invention and that various changes and modifications may be made thereto without departing from the spirit and scope of the invention as defined in the appended claims.

What is claimed is:

1. An eccentric gear arrangement of a motor-driven handheld hedge trimmer, the eccentric gear arrangement comprising:

first and second shearing blades driven in mutual opposition to each other over a displacement path (a);

said first and second shearing blades having respective first and second connecting links formed thereon and said connecting links lying directly one above the other;

an eccentric wheel rotatably driven about a rotational axis;

said eccentric wheel having a drive wheel defining a first side;

said eccentric wheel further having first and second eccentrics arranged on said first side and engaging corresponding ones of said first and second connecting links;

said first and second shearing blades having respective first and second contact pressure surfaces formed thereon in the region of said first and second connecting links;

said first and second contact pressure surfaces being offset with respect to each other so as to cause said first and second contact pressure surfaces to be exposed over at least a portion of said displacement path (a);

first and second downholders for acting on corresponding ones of said first and second contact pressure surfaces;

said first and second shearing blades having respective shearing sections and respective rearward ends lying opposite said shearing sections in the direction of said displacement path (a);

said first and second shearing blades further having first and second contact pressure extensions, respectively, arranged on the corresponding ones of said rearward ends and running parallel to said displacement path (a);

said first and second contact pressure extensions being laterally offset with respect to each other in a lateral direction transverse to said displacement path (a); and, said first and second contact pressure surfaces being formed on corresponding ones of said first and second contact pressure extensions.

2. The eccentric gear arrangement of claim 1, wherein said contact pressure extensions with said contact pressure surfaces have a length (L) corresponding at least approximately to said displacement path (a).

3. An eccentric gear arrangement of a motor-driven handheld hedge trimmer, the eccentric gear arrangement comprising:

first and second shearing blades driven in mutual opposition to each other over a displacement path (a);

said first and second shearing blades having respective first and second connecting links formed thereon and said connecting links lying directly one above the other;

an eccentric wheel rotatably driven about a rotational axis;

said eccentric wheel having a drive wheel defining a first side;

said eccentric wheel further having first and second eccentrics arranged on said first side and engaging corresponding ones of said first and second connecting links;

said first and second shearing blades having respective first and second contact pressure surfaces formed thereon in the region of said first and second connecting links;

said first and second contact pressure surfaces being offset with respect to each other so as to cause said first and second contact pressure surfaces to be exposed over at least a portion of said displacement path (a);

first and second downholders for acting on corresponding ones of said first and second contact pressure surfaces;

said first and second shearing blades having mutually adjacent first and second slide surfaces, respectively, formed thereon laterally of said connecting links with which said shearing blades slide on each other;

said second shearing blade lying remote from said drive wheel and having a third contact pressure surface in overlapment with said second slide surface; and, said eccentric gear arrangement further comprising a third downholder acting on said third contact pressure surface.

4. The eccentric gear arrangement of claim 3, wherein said shearing blade has a fourth contact pressure surface; said eccentric gear arrangement further comprises a fourth downholder; and, said first and second slide surfaces, said third and fourth contact pressure surfaces and said third and fourth downholders constitute respective pairs referred to said displacement path (a).

5. The eccentric gear arrangement of claim 4, further comprising: a gear housing for accommodating said eccentric wheel and said shearing blades in the region of said connecting links thereof and said first and second contact pressure surfaces; and, a holding plate with said first and second downholders also being accommodated in said gear housing.

6. The eccentric gear arrangement of claim 5, wherein said third and fourth downholders are also arranged on said holding plate.

7. The eccentric gear arrangement of claim 6, wherein said holding plate includes said first and second downholders being configured as one piece made of a sheet-metal formed part.

8. The eccentric gear arrangement of claim 7, wherein said holding plate also includes said third and fourth downholders as an integral part thereof.

9. The eccentric gear arrangement of claim 7, wherein said gear housing comprises a housing shell and a housing cover; and, said holding plate is held between said housing shell and said housing cover.

10. The eccentric gear arrangement of claim 9, wherein said gear housing comprises threaded fasteners for holding said holding plate.

11. The eccentric gear arrangement of claim 9, wherein said holding plate is clamped between said housing shell and said housing cover.

12. The eccentric gear arrangement of claim 9, wherein said holding plate is held by being form fitted between said housing shell and said housing cover.

13. The eccentric gear arrangement of claim 9, wherein said holding plate has a bearing opening; and, said eccentric wheel has a journalling pin for engaging said bearing opening.

* * * * *

UNITED STATES PATENT AND TRADEMARK OFFICE
CERTIFICATE OF CORRECTION

| | | |
|---|---|---|
| PATENT NO. | : 8,667,697 B2 | |
| APPLICATION NO. | : 12/929486 | |
| DATED | : March 11, 2014 | |
| INVENTOR(S) | : Hittmann et al. | |

It is certified that error appears in the above-identified patent and that said Letters Patent is hereby corrected as shown below:

In the Specification

<u>Column 3</u>:
Line 12: insert -- is -- after "force".
Line 19: delete "farce" and insert -- force -- therefor.

Signed and Sealed this
Twenty-fourth Day of June, 2014

Michelle K. Lee
*Deputy Director of the United States Patent and Trademark Office*